(12) United States Patent
Tamura et al.

(10) Patent No.: US 9,461,322 B2
(45) Date of Patent: Oct. 4, 2016

(54) HYDROGEN GENERATION APPARATUS AND FUEL CELL SYSTEM

(71) Applicant: PANASONIC CORPORATION, Osaka (JP)

(72) Inventors: Yoshio Tamura, Hyogo (JP); Koichi Kusumura, Osaka (JP); Akinari Nakamura, Shiga (JP); Hiroki Ogura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 236 days.

(21) Appl. No.: 14/372,122

(22) PCT Filed: Oct. 10, 2013

(86) PCT No.: PCT/JP2013/006041
§ 371 (c)(1),
(2) Date: Jul. 14, 2014

(87) PCT Pub. No.: WO2014/083748
PCT Pub. Date: Jun. 5, 2014

(65) Prior Publication Data
US 2015/0171447 A1    Jun. 18, 2015

(30) Foreign Application Priority Data
Nov. 27, 2012  (JP) .................... 2012-258909

(51) Int. Cl.
H01M 8/0606 (2016.01)
H01M 8/0612 (2016.01)
(Continued)

(52) U.S. Cl.
CPC .............. *H01M 8/0606* (2013.01); *C01B 3/02* (2013.01); *C01B 3/38* (2013.01); *H01M 8/04738* (2013.01);
(Continued)

(58) Field of Classification Search
None
See application file for complete search history.

(56) References Cited

U.S. PATENT DOCUMENTS

2012/0040256 A1   2/2012 Kani et al.
2012/0178006 A1   7/2012 Kani et al.

FOREIGN PATENT DOCUMENTS

JP    2002-093447 A    3/2002
JP    2003-017109 A    1/2003
(Continued)

OTHER PUBLICATIONS

International Search Report issued in PCT/JP2013/006041, dated Dec. 17, 2013, with English translation.

*Primary Examiner* — Sarah A Slifka
(74) *Attorney, Agent, or Firm* — McDermott Will & Emery LLP

(57) ABSTRACT

A hydrogen generation apparatus includes: a reformer configured to generate a hydrogen-containing gas by using a raw material; a hydrodesulfurizer configured to remove a sulfur compound from the raw material; a recycle passage through which the hydrogen-containing gas is supplied to the hydrodesulfurizer; a condenser provided on the recycle passage or on a gas passage upstream from the recycle passage; a drain passage through which water condensed in the condenser is drained; a heating medium passage through which a heating medium that recovers heat from the condenser flows; a delivery device configured to cause the heating medium to flow through the heating medium passage; and a controller configured to cause the delivery device to operate when the hydrogen-containing gas is not flowing through the recycle passage at at least one of start-up and stopping of the hydrogen generation apparatus.

4 Claims, 2 Drawing Sheets

(51) Int. Cl.
*H01M 8/0662* (2016.01)
*H01M 8/04701* (2016.01)
*H01M 8/06* (2016.01)
*C01B 3/38* (2006.01)
*H01M 8/04* (2016.01)
*C01B 3/02* (2006.01)

(52) U.S. Cl.
CPC ......... *H01M 8/0612* (2013.01); *H01M 8/0675* (2013.01); *C01B 2203/025* (2013.01); *C01B 2203/0233* (2013.01); *C01B 2203/0244* (2013.01); *C01B 2203/066* (2013.01); *C01B 2203/127* (2013.01); *C01B 2203/148* (2013.01); *Y02E 60/50* (2013.01)

(56) References Cited

FOREIGN PATENT DOCUMENTS

| | | |
|---|---|---|
| JP | 2008-243691 A | 10/2008 |
| JP | 2008-277308 A | 11/2008 |

HYDROGEN GENERATION APPARATUS AND FUEL CELL SYSTEM

RELATED APPLICATIONS

This application is the U.S. National Phase under 35 U.S.C. §371 of International Application No. PCT/JP2013/006041, filed on Oct. 10, 2013, which in turn claims the benefit of Japanese Application No. 2012-258909, filed on Nov. 27, 2012, the disclosures of which Applications are incorporated by reference herein.

TECHNICAL FIELD

The present invention relates to hydrogen generation apparatuses and fuel cell systems.

BACKGROUND ART

A hydrogen-containing gas can be generated from a raw material through a reforming reaction. At the time, the raw material contains sulfur compounds. Since the sulfur compounds cause poisoning of a reforming catalyst, it is necessary to remove the sulfur compounds. The sulfur compounds can be removed by, for example, hydrodesulfurization in which a hydrogen gas and the raw material are mixed together.

Accordingly, part of the hydrogen-containing gas generated through the reforming reaction is returned to a raw material passage (hereinafter, such an operation is called "recycle"). In order to suppress water blockage in a recycle passage, there is proposed an apparatus configuration in which the recycle passage is provided with a condenser, and there is also another proposed apparatus configuration in which a hydrogen-containing gas that has passed through a condenser flows into the recycle passage (see Patent Literature 1, for example).

CITATION LIST

Patent Literature

PTL 1: Japanese Laid-Open Patent Application Publication No. 2003-17109

SUMMARY OF INVENTION

Technical Problem

However, such a conventional hydrogen generation apparatus does not take account of a problem of water condensation from a recycle gas at start-up and stopping of the hydrogen generation apparatus.

The present invention has been made in view of the above-described problems. An object of the present invention is to provide a hydrogen generation apparatus and a fuel cell system capable of reducing the amount of steam that is condensed from a recycle gas without being condensed in a condenser as compared to conventional technology at at least one of start-up and stopping of the hydrogen generation apparatus and the fuel cell system.

Solution to Problem

In order to solve the above-described problems, a hydrogen generation apparatus according to one aspect of the present invention includes: a reformer configured to generate a hydrogen-containing gas by using a raw material; a hydrodesulfurizer configured to remove a sulfur compound from the raw material; a recycle passage through which the hydrogen-containing gas is supplied to the hydrodesulfurizer; a condenser provided on the recycle passage or on a gas passage upstream from the recycle passage; a drain passage through which water condensed in the condenser is drained; a heating medium passage through which a heating medium that recovers heat from the condenser flows; a delivery device configured to cause the heating medium to flow through the heating medium passage; and a controller configured to cause the delivery device to operate when the hydrogen-containing gas is not flowing through the recycle passage at at least one of start-up and stopping of the hydrogen generation apparatus.

A fuel cell system according one aspect of the present invention includes: the above-described hydrogen generation apparatus; and a fuel cell configured to generate electric power by using the hydrogen-containing gas that is supplied from the hydrogen generation apparatus.

Advantageous Effects of Invention

The hydrogen generation apparatus and the fuel cell system according to the above aspects of the present invention are capable of reducing the amount of steam that is condensed from a recycle gas without being condensed in a condenser as compared to conventional technology at at least one of start-up and stopping of the hydrogen generation apparatus and the fuel cell system.

DESCRIPTION OF EMBODIMENTS

The inventors of the present invention conducted diligent studies regarding a problem of water condensation from a recycle gas at start-up and stopping of a hydrogen generation apparatus. As a result of the studies, the inventors have obtained findings as described below.

While the hydrogen generation apparatus is in operation, the recycle gas that flows through a recycle passage can be cooled down in a condenser by using a heating medium. Accordingly, in this case, in the condenser, steam of the recycle gas is condensed into water and the water is removed.

However, the inventors of the present invention have found out that at start-up and stopping of such a conventional hydrogen generation apparatus, a delivery device for feeding the heating medium to the condenser is stopped from operating, which causes a situation where the recycle gas cannot be cooled down sufficiently. If the recycle gas cannot be sufficiently cooled down at start-up and stopping of the hydrogen generation apparatus, there is a possibility that the water condensation and removal performed in the condenser are hindered at such timings.

Embodiment 1

A hydrogen generation apparatus according to the present embodiment includes: a reformer configured to generate a hydrogen-containing gas by using a raw material; a hydrodesulfurizer configured to remove a sulfur compound from the raw material; a recycle passage through which the hydrogen-containing gas is supplied to the hydrodesulfurizer; a condenser provided on the recycle passage or on a gas passage upstream from the recycle passage; a drain passage through which water condensed in the condenser is drained; a heating medium passage through which a heating medium that recovers heat from the condenser flows; a delivery device configured to cause the heating medium to flow through the heating medium passage; and a controller configured to cause the delivery device to operate when the hydrogen-containing gas is not flowing through the recycle passage at at least one of start-up and stopping of the hydrogen generation apparatus.

According to the above configuration, at at least one of start-up and stopping of the hydrogen generation apparatus, the amount of steam that is condensed from a recycle gas without being condensed in the condenser can be reduced compared to conventional technology.

[Apparatus Configuration]

Figure 1:
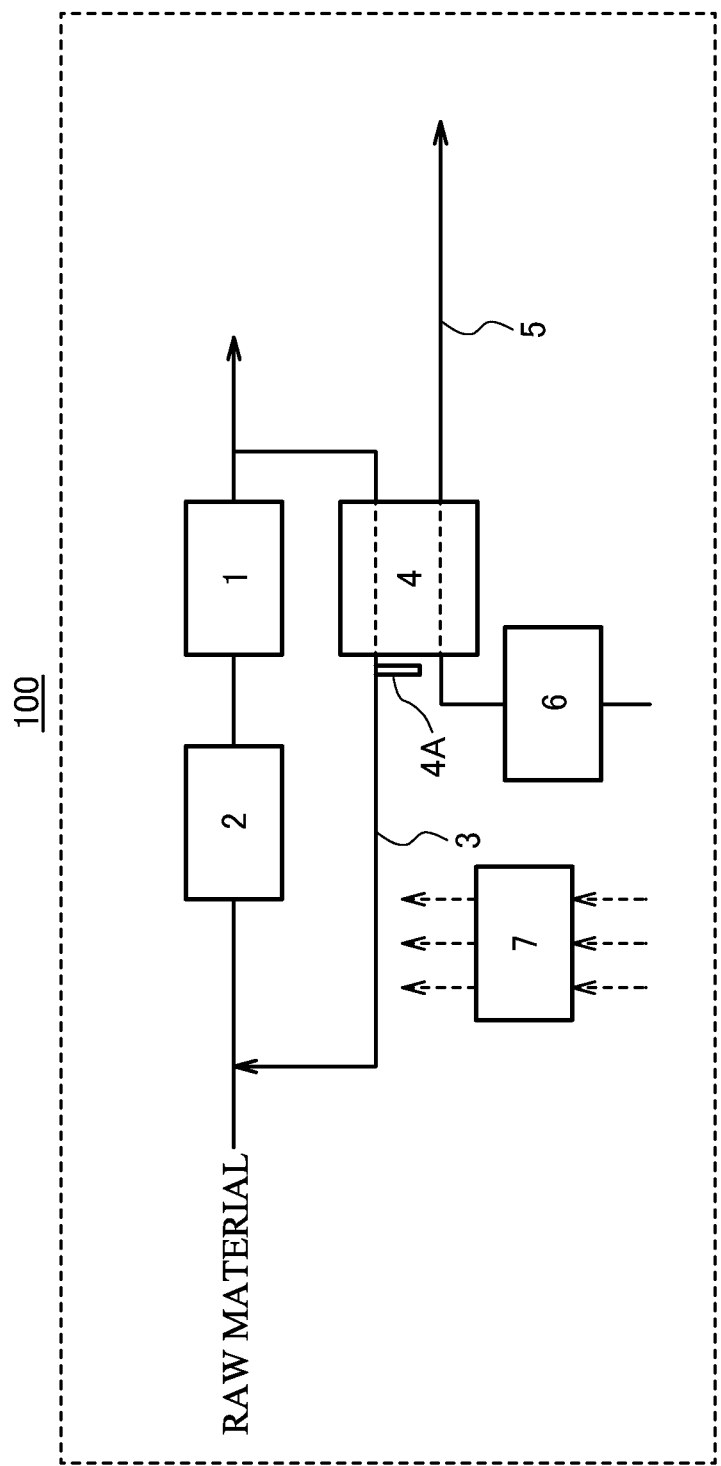
FIG. 1 shows one example of a hydrogen generation apparatus according to Embodiment 1.

FIG. 1 shows one example of the hydrogen generation apparatus according to Embodiment 1.

In the example shown in FIG. 1, a hydrogen generation apparatus 100 according to the present embodiment includes a reformer 1, a hydrodesulfurizer 2, a recycle passage 3, a condenser 4, a drain passage 4A, a heating medium passage 5, a delivery device 6, and a controller 7.

The reformer 1 generates a hydrogen-containing gas by using a raw material. To be specific, a reforming reaction of the raw material is caused at a reforming catalyst part (not shown) in the reformer 1, and thereby the hydrogen-containing gas is generated. The reforming reaction may be any type of reforming reaction. Examples of the reforming reaction include a steam reforming reaction, an autothermal reaction, and a partial oxidation reaction. The hydrogen generation apparatus 100 includes, as necessary, devices required for the reforming reaction although they are not shown in FIG. 1. For example, if the reforming reaction is a steam reforming reaction, the hydrogen generation apparatus 100 includes: a combustor configured to heat the reforming catalyst part; an evaporator configured to generate steam; and a water supply device configured to supply water to the evaporator. If the reforming reaction is an autothermal reaction, the hydrogen generation apparatus 100 further includes an air supply device configured to supply air to the reformer. It should be noted that the raw material contains an organic compound comprised of at least carbon and hydrogen, such as city gas or natural gas containing methane as a main component, or LPG.

The hydrodesulfurizer 2 removes sulfur compounds from the raw material. The hydrodesulfurizer 2 is formed by packing a container with a desulfurization agent for use in hydrodesulfurization. For example, the desulfurization agent for use in hydrodesulfurization is formed of: a CoMo-based catalyst for converting sulfur compounds in the raw material gas into hydrogen sulfide; and a ZnO-based catalyst or a CuZn-based catalyst, which is a sulfur adsorbent for removing the hydrogen sulfide by adsorption and which is provided downstream from the CoMo-based catalyst. However, the desulfurization agent for use in hydrodesulfurization is not limited to this example. The desulfurization agent may be formed solely of a CuZn-based catalyst having a function of converting sulfur compounds into hydrogen sulfide and a function of adsorbing the hydrogen sulfide.

The recycle passage 3 is a passage through which the hydrogen-containing gas is supplied to the hydrodesulfurizer 2. The upstream end of the recycle passage 3 may be connected to any portion of a passage through which the hydrogen-containing gas from the reformer 1 flows. For example, in a case where a CO reducer configured to reduce carbon monoxide in the hydrogen-containing gas is provided downstream from the reformer 1, the upstream end of the recycle passage 3 may be connected to a passage between the reformer 1 and the CO reducer, or may be connected to the CO reducer, or may be connected downstream from the CO reducer. It should be noted that if the CO reducer includes a shift converter and a CO remover, the shift converter being configured to reduce carbon monoxide through a shift reaction, the CO remover being configured to reduce carbon monoxide through at least one of an oxidation reaction and a methanation reaction, then the upstream end of the recycle passage 3 may be connected to a passage between the shift converter and the CO remover. Alternatively, the upstream end of the recycle passage 3 may be connected to a passage downstream from a hydrogen utilizing apparatus that utilizes the hydrogen-containing gas.

It should be noted that it is not essential for the hydrogen generation apparatus 100 to include a CO reducer and/or a CO remover. These devices may be eliminated, so long as an apparatus that utilizes the gas generated by the hydrogen generation apparatus 100 is allowed to deliver its required performance.

The condenser 4 is provided on the recycle passage 3 or on a gas passage upstream from the recycle passage 3. The condenser 4 cools down the gas through heat exchange, thereby condensing steam in the gas.

The drain passage 4A drains water condensed in the condenser 4. The drain passage 4A may be configured in any form, so long as the drain passage 4A is configured to drain water condensed in the condenser 4. For example, piping that forms the drain passage 4A may be in communication with the interior of the condenser 4. A water tank may be provided at the end of the drain passage 4A. Any sealing mechanism may be provided at the end of the drain passage 4A. Examples of the sealing mechanism include a valve and a water sealing mechanism.

In the example shown in FIG. 1, the gas to be cooled down is a recycle gas in the recycle passage 3. However, as an alternative, the gas to be cooled down may be the hydrogen-containing gas that has not yet been introduced into the recycle passage 3. That is, part of the hydrogen-containing gas may be separated as a recycle gas, and steam in the recycle gas may be condensed by the condenser 4, or alternatively, all the steam in the hydrogen-containing gas that has not yet been introduced into the recycle passage 3 may be condensed by a condenser (not shown), and then part of the hydrogen-containing gas from which the steam has been removed may be separated as a recycle gas. Although the condenser 4 is configured as a heat exchanger, the condenser 4 may be configured in any form, so long as the condenser 4 is configured to cool down the gas. Condensation water condensed in the condenser 4 is removed, via the drain passage 4A, from a passage through which the gas that has been cooled down by the condenser 4 flows.

Through the heating medium passage 5, a heating medium that recovers heat from the condenser 4 flows. Accordingly, the condenser 4 is cooled down by the heating medium. For example, water, an antifreezing fluid, or the raw material is used as the heating medium. The heating medium flowing through the heating medium passage 5 may be utilized for any purpose. For example, if the heating medium is water or an antifreezing fluid, then the heat of the heating medium may be utilized in such a manner as to store the heating medium in a hot water storage tank or flow the heating medium through a heating circuit. If the heating medium is the raw material, the raw material that has passed through the condenser 4 may be supplied to the reformer 1.

The delivery device 6 is a device for causing the heating medium to flow through the heating medium passage 5. The delivery device 6 may be any device, so long as the device is capable of causing the heating medium to flow through the heating medium passage 5. For example, the delivery device 6 may be a pump.

The controller 7 causes the delivery device 6 to operate when the hydrogen-containing gas is not flowing through the recycle passage 3 at at least one of start-up and stopping of the hydrogen generation apparatus 100. The controller 7 may have functions of receiving a signal indicative of a state of operation of the hydrogen generation apparatus 100 and transmitting a control signal to the delivery device 6 in accordance with the received signal. For example, the controller 7 may include an arithmetic processing unit (not shown) and a storage unit (not shown) storing control programs Examples of the arithmetic processing unit include an MPU and a CPU. The storage unit is a memory, for example. The controller 7 may be configured as a single controller performing centralized control, or may be configured as multiple controllers performing distributed control in cooperation with each other.

[Operation]

Hereinafter, operations of the hydrogen generation apparatus 100 are described with reference to FIG. 1. The operations described below are performed through control by the controller 7.

While the hydrogen generation apparatus 100 is in operation, the raw material passes through the hydrodesulfurizer 2, and thereby sulfur compounds are removed from the raw material.

Part of the hydrogen-containing gas generated in the reformer 1 is returned to a raw material passage through the recycle passage 3. The returned hydrogen-containing gas is mixed with the raw material, and thereafter supplied to the hydrodesulfurizer 2. When the hydrodesulfurizer 2 is supplied with the hydrogen-containing gas, the hydrodesulfurizer 2 can remove sulfur compounds from the raw material through a hydrogenation reaction.

The reformer 1 and the hydrodesulfurizer 2 need to be heated to respective temperatures suitable for their catalytic reactions. The reformer 1 is heated up by combusting the hydrogen-containing gas discharged from the reformer 1 in a combustor (not shown). The hydrodesulfurizer 2 may be heated up by any heating device, so long as the heating device is capable of heating up the hydrodesulfurizer 2. For example, heat from the reformer 1 may be transferred to the hydrodesulfurizer 2, or a different heating device such as an electric heater (not shown) may be used to heat up the hydrodesulfurizer 2.

The recycle gas that flows through the recycle passage 3 contains steam. Therefore, if the recycle gas in such a state is flowed through the recycle passage 3, there is a possibility that the steam in the recycle gas becomes condensed, causing passage blockage in the recycle passage 3.

Moreover, in a case where the temperature of the raw material is lower than the temperature of the recycle gas, if the recycle gas is mixed with the raw material without condensing the steam in the recycle gas in advance, then the steam in the mixed gas becomes condensed in the raw material passage. In this case, problems arise, for example, passage blockage occurs in the raw material passage, and thereby a necessary amount of raw material cannot be fed to the reformer 1.

In view of the above, in the present embodiment, the condenser 4 is provided on the recycle passage 3, or provided upstream from the recycle passage 3, in order to reduce the amount of steam contained in the recycle gas flowing through the recycle passage 3.

The recycle gas and the heating medium in the heating medium passage 5 flow through the condenser 4. The recycle gas and the heating medium exchange heat with each other in the condenser 4. As a result of the heat exchange, the recycle gas is cooled down, and thereby the amount of steam contained in the recycle gas flowing through the recycle passage 3 can be reduced. The temperature of the recycle gas after the recycle gas is cooled down may be any temperature, so long as the temperature does not cause water condensation after the recycle gas and the raw material gas are mixed together. In the present embodiment, the temperature of the recycle gas after the recycle gas is cooled down may be designed to be 40° C. or lower, for example. In this case, even if the temperature of the raw material gas that is to merge with the recycle gas is close to a room temperature, water condensation from the recycle gas mixed with the raw material gas is suppressed, so long as the recycle passage 3 is cooled down by a ventilation gas that is flowed inside the casing by a ventilator (not shown). Moreover, water condensation from the recycle gas mixed with the raw material gas is suppressed if the configuration is made such that the raw material gas is heated up before mixed with the recycle gas.

Generally speaking, at start-up of the hydrogen generation apparatus 100, flowing the recycle gas into the recycle passage 3 is started when the hydrogen-containing gas begins to be generated in the reformer 1.

When the flowing of the recycle gas is started, if the condenser 4 has not yet been cooled down by the heating medium flowing through the heating medium passage 5, then the steam in the recycle gas cannot be sufficiently condensed in the condenser 4.

In this case, there is a possibility that the steam becomes condensed in a gas passage downstream from the condenser 4 (e.g., the recycle passage 3 or the raw material passage), and thereby passage blockage occurs.

In view of the above, in the present embodiment, at start-up of the hydrogen generation apparatus 100, the controller 7 causes the delivery device 6 to operate when the hydrogen-containing gas is not flowing through the recycle passage 3.

Accordingly, through the operation of the delivery device 6, the heating medium in the heating medium passage 5 can be fed to the condenser 4 before the recycle gas starts flowing through the recycle passage 3, and thereby the condenser 4 can be cooled down. As a result, at start-up of the hydrogen generation apparatus 100, when the flowing of the recycle gas is started, the amount of condensation water in the gas passage downstream from the condenser 4 can be reduced compared to conventional technology. That is, passage blockage in the gas passage downstream from the condenser 4 can be suppressed.

It should be noted that when increasing the temperature of the reformer 1 or the evaporator is started at start-up of the hydrogen generation apparatus 100, liquid water remaining in the reformer 1 or the evaporator evaporates, which leads to a possibility that steam flows into the recycle passage 3 in a diffused manner. Therefore, the delivery device 6 may be operated while the temperature of the reformer 1 or the evaporator is being increased.

When the hydrogen generation apparatus 100 is stopped, the generation of the hydrogen-containing gas is stopped. As a result, the recycle gas stops flowing through the recycle passage 3. Here, even when the recycle gas has stopped flowing, the recycle gas from which the steam has not been removed by condensation still remains, for example, in the recycle passage 3 in the condenser 4 and the recycle passage 3 upstream from the condenser 4. There is a possibility that water condensed from such recycle gas causes blockage in the recycle passage 3 during the stopping of the hydrogen generation apparatus 100.

In view of the above, in the present embodiment, at stopping of the hydrogen generation apparatus 100, the controller 7 causes the delivery device 6 to operate when the hydrogen-containing gas is not flowing through the recycle passage 3.

That is, even after the recycle gas has stopped flowing, the heating medium in the heating medium passage 5 continues to flow owing to the operation of the delivery device 6. As a result, steam remaining in the recycle passage 3 in the condenser 4 is condensed, and condensation water produced in the condenser 4 is drained out of the drain passage 4A. The volume of the recycle gas in the recycle passage 3 in the condenser 4 is reduced since the steam in the recycle gas is condensed. As a result, part of the recycle gas in the recycle passage 3 upstream from the condenser 4 flows into the recycle passage 3 in the condenser 4. Steam in the recycle gas that has thus flowed in is also condensed into water owing to the operation of the delivery device 6, and thereby the steam is removed.

In the above-described manner, at stopping of the hydrogen generation apparatus 100, the amount of steam contained in the recycle gas in the recycle passage 3 in the condenser 4 and in the recycle passage 3 upstream from the condenser 4 can be reduced compared to conventional technology. That is, at stopping of the hydrogen generation apparatus 100, the amount of steam that is condensed from the recycle gas without being condensed in the condenser 4 is reduced, and thereby passage blockage in the recycle passage 3 due to condensation water can be suppressed.

It should be noted that a period during which the delivery device 6 continues operating after the recycle gas has stopped flowing may be set to any length of time although it depends on, for example, the amount of heating medium to be fed to the condenser 4 or the volume of the recycle passage 3.

It should be noted that the delivery device 6 may start operating before the supply of the raw material to the reformer 1 is stopped, or may start operating after the supply of the raw material to the reformer 1 is stopped.

At stopping of the hydrogen generation apparatus 100, after the generation of the hydrogen-containing gas in the reformer 1 and the combustion operation in the combustor are stopped, there is still a possibility that liquid water remaining in the reformer 1 or the evaporator evaporates due to residual heat, causing steam to flow into the recycle passage 3 in a diffused manner. Therefore, the delivery device 6 may be caused to operate while the water remaining in the reformer 1 or the evaporator is evaporating. It should be noted that examples of a case where liquid water remaining in the reformer 1 and the evaporator evaporates due to residual heat include: a case where liquid water present in the reformer 1 and liquid water present in the evaporator evaporate due to residual heat in the reformer 1 and residual heat in the evaporator, respectively; and a case where after the generation of the hydrogen-containing gas in the reformer 1 and the combustion operation in the combustor are stopped, combustion air is supplied to the combustor, and as a result, residual heat in the reformer 1 is transferred to the evaporator, causing liquid water in the evaporator to evaporate.

Example 1

A hydrogen generation apparatus according to Example 1 is configured such that, in the hydrogen generation apparatus according to Embodiment 1, at start-up of the hydrogen generation apparatus, the controller causes the delivery device to operate before generation of the hydrogen-containing gas by the reformer is started.

According to the above configuration, the condenser can be cooled down at start-up of the hydrogen generation apparatus, and the amount of steam that is condensed from the recycle gas without being condensed in the condenser can be reduced compared to conventional technology.

Other than the above features, the hydrogen generation apparatus according to Example 1 may be configured in the same manner as the hydrogen generation apparatus according to Embodiment 1.

[Apparatus Configuration]

Since the apparatus configuration of the hydrogen generation apparatus according to Example 1 is the same as the apparatus configuration described in Embodiment 1, the description of the apparatus configuration is omitted.

[Operation]

Hereinafter, operations of the hydrogen generation apparatus 100 according to Example 1 are described. The operations described below are performed through control by the controller 7.

It should be noted that other than the operations described below, the operations of the hydrogen generation apparatus 100 according to Example 1 may be the same as the operations of the hydrogen generation apparatus 100 according to Embodiment 1.

At start-up of the hydrogen generation apparatus 100, since the reformer 1 is not generating the hydrogen-containing gas, the hydrodesulfurization catalyst in the hydrodesulfurizer 2 cannot exert its function. That is, after the reformer 1 starts generating the hydrogen-containing gas, part of the hydrogen-containing gas starts flowing through the recycle passage 3, which allows the hydrodesulfurization catalyst in the hydrodesulfurizer 2 to exert its function.

In view of the above, in Example 1, at start-up of the hydrogen generation apparatus 100, the controller 7 causes the delivery device 6 to operate before the generation of the hydrogen-containing gas by the reformer 1 is started.

As described above, the timing of starting feeding the heating medium to the condenser 4 through the operation of the delivery device 6 is set to precede the start of the generation of the hydrogen-containing gas by the reformer 1. This makes it possible to flow the heating medium to the condenser 4 before the recycle gas starts flowing through the recycle passage 3. As a result, the recycle gas flows through the condenser 4 when the condenser 4 has already been cooled down. Therefore, when the recycle gas has started flowing, the amount of water condensation in the gas passage downstream from the condenser 4 can be reduced compared to conventional technology.

Example 2

A hydrogen generation apparatus according to Example 2 is configured such that, in the hydrogen generation apparatus according to Embodiment 1, at stopping of the hydrogen generation apparatus, the controller causes the delivery device to operate after supply of the raw material to the reformer is stopped.

According to the above configuration, at stopping of the hydrogen generation apparatus, the recycle gas can be cooled down by using the condenser, and the amount of steam that is condensed from the recycle gas without being condensed in the condenser can be reduced compared to conventional technology.

Other than the above features, the hydrogen generation apparatus according to Example 2 may be configured in the same manner as the hydrogen generation apparatus according to Embodiment 1.

[Apparatus Configuration]

Since the apparatus configuration of the hydrogen generation apparatus according to Example 2 is the same as the apparatus configuration described in Embodiment 1, the description of the apparatus configuration is omitted.

[Operation]

Hereinafter, operations of the hydrogen generation apparatus 100 according to Example 2 are described. The operations described below are performed through control by the controller 7.

It should be noted that other than the operations described below, the operations of the hydrogen generation apparatus 100 according to Example 2 may be the same as the operations of the hydrogen generation apparatus 100 according to Embodiment 1.

At stopping of the hydrogen generation apparatus 100, the supply of the raw material to the reformer 1 is stopped. At the time, the generation of the hydrogen-containing gas stops. As a result, the recycle gas stops flowing through the recycle passage 3.

In view of the above, in Example 2, at stopping of the hydrogen generation apparatus 100, the controller 7 causes the delivery device 6 to operate after the supply of the raw material to the reformer 1 is stopped.

As described above, by feeding the heating medium to the condenser 4 after the supply of the raw material to the reformer 1 is stopped, the amount of steam that is condensed from the recycle gas without being condensed in the condenser can be reduced.

Embodiment 2

A fuel cell system according to Embodiment 2 includes: the hydrogen generation apparatus according to any one of Embodiment 1, Example 1 of Embodiment 1, and Example 2 of Embodiment 1; and a fuel cell configured to generate electric power by using the hydrogen-containing gas that is supplied from the hydrogen generation apparatus.

According to the above configuration, the hydrogen-containing gas that is generated by the hydrogen generation apparatus of any one of Embodiment 1, Example 1 of Embodiment 1, and Example 2 of Embodiment 1 can be used as a fuel for the fuel cell, and thereby electric power can be generated.

According to the above configuration, at at least one of start-up and stopping of the fuel cell system, the amount of steam that is condensed from the recycle gas without being condensed in the condenser can be reduced compared to conventional technology.

[Apparatus Configuration]

Figure 2:
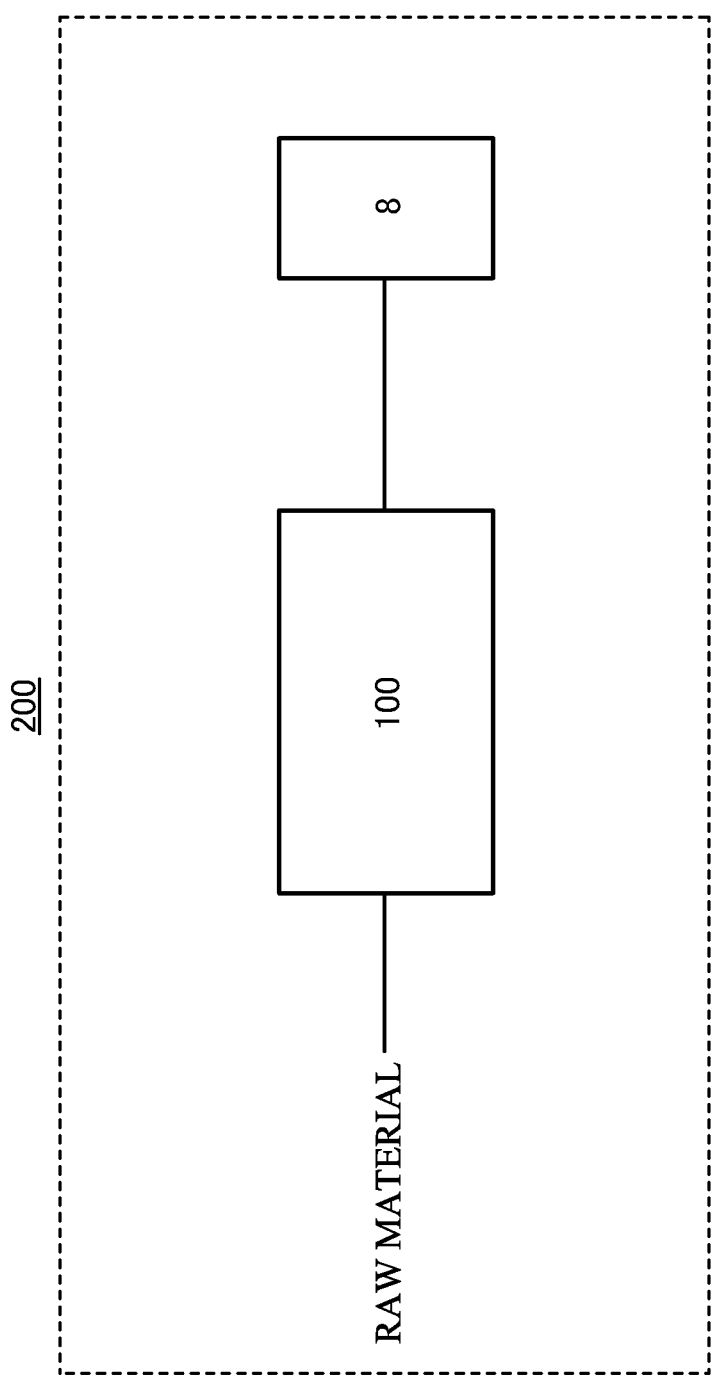
FIG. 2 shows one example of a fuel cell system according to Embodiment 2.

FIG. 2 shows one example of the fuel cell system according to Embodiment 2.

In the example shown in FIG. 2, a fuel cell system 200 according to the present embodiment includes: the hydrogen generation apparatus 100 according to any one of Embodiment 1, Example 1 of Embodiment 1, and Example 2 of Embodiment 1; and a fuel cell 8.

The fuel cell 8 is a fuel cell configured to generate electric power by using the hydrogen-containing gas that is supplied from the hydrogen generation apparatus 100. The fuel cell 8 may be any type of fuel cell. Examples of the fuel cell 8 include a solid polymer fuel cell, a polymer electrolyte fuel cell, a solid oxide fuel cell, and a phosphoric acid fuel cell.

[Operation]

When performing a power generation operation, the fuel cell system 200 generates electric power by using the hydrogen-containing gas that is supplied from the hydrogen generation apparatus 100.

It should be noted that if the fuel cell 8 is regarded as the hydrogen utilizing apparatus that utilizes the hydrogen-containing gas generated by the hydrogen generation apparatus 100 of any one of Embodiment 1, Example 1 of Embodiment 1, and Example 2 of Embodiment 1, then the operations of the hydrogen generation apparatus 100 are the same as those described in any one of Embodiment 1, Example 1 of Embodiment 1, and Example 2 of Embodiment 1. Therefore, a detailed description of the operations is omitted.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

A hydrogen generation apparatus and a fuel cell system according to one aspect of the present invention are capable of reducing the amount of steam that is condensed from a recycle gas without being condensed in a condenser at at least one of start-up and stopping of the hydrogen generation apparatus and the fuel cell system. Therefore, the one aspect of the present invention is applicable to a hydrogen generation apparatus including a hydrodesulfurizer and to a fuel cell system.

REFERENCE SIGNS LIST 1 reformer
2 hydrodesulfurizer
3 recycle passage
4 condenser
4A drain passage
5 heating medium passage
6 delivery device
7 controller
8 fuel cell
100 hydrogen generation apparatus
200 fuel cell system

The invention claimed is:

1. A method of operating a hydrogen generation apparatus, the method comprising:
   generating, by a reformer, a hydrogen-containing gas by using a raw material;
   removing, by a hydrodesulfurizer, a sulfur compound from the raw material by using hydrogen in the hydrogen-containing gas that is supplied to the hydrodesulfurizer through a recycle passage;

draining, through a drain passage, water condensed in a condenser, the condenser being provided on the recycle passage or on a gas passage upstream from the recycle passage; and causing a delivery device to operate, the delivery device being configured to cause a heating medium that recovers heat from the condenser to flow, when the hydrogen-containing gas is not flowing through the recycle passage at at least one of start-up and stopping of the hydrogen generation apparatus.

2. The method of operating a hydrogen generation apparatus according to claim 1, wherein causing the delivery device to operate includes causing, at start-up of the hydrogen generation apparatus, the delivery device to operate before generating the hydrogen-containing gas by the reformer is started.

3. The method of operating a hydrogen generation apparatus according to claim 1, wherein causing the delivery device to operate includes causing, at stopping of the hydrogen generation apparatus, the delivery device to operate after supply of the raw material to the reformer is stopped.

4. A method of operating a fuel cell system, the method comprising:

generating, by a reformer, a hydrogen-containing gas by using a raw material;

removing, by a hydrodesulfurizer, a sulfur compound from the raw material by using hydrogen in the hydrogen-containing gas that is supplied to the hydrodesulfurizer through a recycle passage;

draining, through a drain passage, water condensed in a condenser, the condenser being provided on the recycle passage or on a gas passage upstream from the recycle passage;

causing a delivery device to operate, the delivery device being configured to cause a heating medium that recovers heat from the condenser to flow, when the hydrogen-containing gas is not flowing through the recycle passage at at least one of start-up and stopping of the hydrogen generation apparatus; and generating, by a fuel cell, electric power by using the hydrogen-containing gas.

* * * * *